(12) United States Patent
Timmons

(10) Patent No.: US 8,160,546 B2
(45) Date of Patent: Apr. 17, 2012

(54) SYSTEM AND METHOD FOR ENHANCED MOBILE USER REWARDS

(75) Inventor: Michael Timmons, San Jose, CA (US)

(73) Assignee: Sybase 365, Inc., Reston, VA (US)

( * ) Notice: Subject to any disclaimer, the term of this patent is extended or adjusted under 35 U.S.C. 154(b) by 457 days.

(21) Appl. No.: 12/357,633

(22) Filed: Jan. 22, 2009

(65) Prior Publication Data

US 2010/0184404 A1 Jul. 22, 2010

Related U.S. Application Data

(60) Provisional application No. 61/024,040, filed on Jan. 28, 2008.

(51) Int. Cl.
*H04M 11/00* (2006.01)

(52) U.S. Cl. .............. 455/406; 455/466; 705/14.25; 705/14.27

(58) Field of Classification Search .............. 455/406, 455/466; 705/14.25, 14.27
See application file for complete search history.

(56) References Cited

U.S. PATENT DOCUMENTS

| | | | | |
|---|---|---|---|---|
| 2005/0192021 | A1* | 9/2005 | Lee et al. | 455/452.2 |
| 2006/0074701 | A1* | 4/2006 | Liu | 705/1 |

* cited by examiner

*Primary Examiner* — Nick Corsaro
*Assistant Examiner* — Amanuel Lebassi
(74) *Attorney, Agent, or Firm* — Edell, Shapiro & Finnan, LLC

(57) ABSTRACT

Coincident with the evolution, maturation, etc. of wireless messaging ecosystems an infrastructure that supports offering to mobile subscribers different types of rewards (for example, possibly inter alia, cash, free service offerings, product coupons and/or discounts, popularity indicators, etc.) for specific mobile subscriber behaviors including, possibly inter alia, a mobile subscribers' creation and sending of increasing numbers of certain types of messages. The infrastructure may optionally leverage the capabilities of a centrally-located Messaging Inter-Carrier Vendor.

30 Claims, 9 Drawing Sheets

SYSTEM AND METHOD FOR ENHANCED MOBILE USER REWARDS

This application claims the benefit of U.S. Provisional Patent Application Ser. No. 61/024,040, filed on Jan. 28, 2008, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), Internet Protocol (IP) Multimedia Subsystem (IMS), Wireless Application Protocol (WAP), etc.

2. Background of the Invention

As the 'wireless revolution' continues to march forward the importance to a Mobile Subscriber (MS)—for example a user of a Wireless Device (WD) such as a mobile telephone, a BlackBerry, etc. that is serviced by a Wireless Carrier (WC)—of their WD grows substantially.

One consequence of such a growing importance is the resulting ubiquitous nature of WDs—i.e., MSs carry them at almost all times and use them for an ever-increasing range of activities. For example, as reported by the industry group CTIA (see www.ctia.org) as of June 2007 there were in the U.S. approximately 243 million WD users.

Coincident with the rapid growth of WDs has been the desire of WCs, and other entities within a wireless messaging ecosystem, to offer MSs a continuing stream of new and interesting products and services that, possibly inter alia, attract new MSs and retain existing MSs, leverage or exploit the continually increasing features and capabilities of new WDs, incrementally increase the volume of messaging traffic (and the revenue that is associated with same) that flows through a wireless messaging ecosystem, etc.

Under various of the product/service offerings that were referred to above it would be desirable to be able to reward a MS (with, possibly inter alia, cash, free service offerings, product coupons and/or discounts, popularity indicators, etc.) for specific MS behaviors including, possibly inter alia, a MS' creation and sending of increasing numbers of certain types of messages. For example:

1) Joe is very popular in his high school and his acquaintances desire to be part of his message groups. His messages are entertaining and informative. In addition to text messages Joe will occasionally include in his messages various types of content (including for example photos taken with his WD's camera, small video clips also taken with his WD, third-party advertisements, pieces of User Generated Content [UGC], etc.). Joe's WC (possibly inter alia) might reward Joe based on possibly inter alia the number of messages that Joe sends to groups, Joe's inclusion of content in his messages, each time a recipient of one of Joe's messages acts upon the content in a message (e.g., visits an indicated Uniform Resource Locator [URL], replies to an indicated Telephone Number [TN] or Short Code [SC], etc.), each time a recipient of one of Joe's messages replies to a message, etc.

2) As word of Joe's messages spreads other MSs will contact Joe and ask to be included in one or more of Joe's groups. Joe's WC (possibly inter alia) might reward Joe based on possibly inter alia the number of MS that Joe adds to his groups, the number of 'Welcome to my group!' messages that Joe may send to new group members (such messages containing, possibly inter alia, content as described above), each time a recipient of one of Joe's messages acts upon the content in a message (as described for example above), each time a recipient of one of Joe's messages replies to a message (as part of possibly inter alia a confirmation, opt-in, etc. process), etc.

3) Tammy is a well-regarded financial advisor who sends numerous market update, analysis, etc. messages during the course of a day. Tammy may include in her messages different pieces of content (including for example market charts and graphs, advertisements from financial and other third-parties, pieces of UGC, etc.). Tammy's WC (possibly inter alia) might reward Tammy based on possibly inter alia the number of messages that Tammy sends to a group, Tammy's inclusion of content in her messages, each time a recipient of one of Tammy's messages acts upon the content in a message (e.g., visits an indicated URL, replies to an indicated TN or SC, etc.), each time a recipient of one of Tammy's messages replies to a message, etc.

4) In connection with a new product or service offering, an upcoming motion picture or television show or musical album, an upcoming conference event, etc. a third-party may provide one or more pieces of content (including possibly inter alia an advertisement, a piece of UGC, etc.). A WC (possibly inter alia) may incent MSs to employ such content by rewarding, for example, a MS when they include such content in their messages; a recipient of a MS' message when they act upon the content in a message (e.g., visit an indicated URL, reply to an indicated TN or SC, etc.); a content provider when their content is selected by and/or acted upon by a MS; etc.

The specific examples that were described above are illustrative only and it will be readily apparent to one of ordinary skill in the relevant art that numerous other examples are easily possible and indeed are fully within the scope of the present invention.

The present invention facilitates aspects of an infrastructure that provides MS rewards and addresses, in new and innovatory ways, various of the (not insubstantial) challenges that are associated with same.

SUMMARY OF THE INVENTION

In one embodiment of the present invention there is provided a method for rewarding MSs that includes possibly inter alia receiving an incoming (SMS, MMS, etc.) message; completing various processing steps including (a) leveraging information previously supplied by a MS, (b) identifying one or more destination addresses, (c) optionally retrieving content, and (d) incrementing one or more reward counters; and generating one or more outgoing (SMS, MMS, etc.) messages where such messages include possibly among other things aspects of the incoming message, the retrieved content (if applicable), etc. and are addressed to the identified destination addresses.

In the embodiment the retrieved content may take the form of an advertisement, UGC, a URL, etc.

Still in accordance with the embodiment, the unit of measure of a reward counter may be money, points, or credits; a MS may be able to monitor the value of a reward counter; and a MS may redeem some portion of a reward counter as a reward where (1) the magnitude of a reward may be based on a combination of one or more of number of messages, message audience, popularity indicators, and content inclusion and (2) a reward may be realized as a combination of one or more of cash, a cash equivalent, a service offering, a coupon, or a discount.

Still in accordance with the embodiment, the value of a reward counter may be incremented in response to a recipient of a (SMS, MMS, etc.) message acting on aspects of the content that was included in the message.

In another embodiment of the present invention there is provided a system for rewarding MSs that includes possibly inter alia a gateway at which an incoming (SMS, MMS, etc.) message may be received and workflow modules that may be configured, etc. to (a) leverage information previously supplied by a MS, (b) identify one or more destination addresses, (c) optionally retrieve content, (d) increment one or more reward counters, and (e) generate one or more outgoing (SMS, MMS, etc.) messages where such messages include possibly among other things aspects of the incoming message, the retrieved content (if applicable), etc. and are addressed to the identified destination addresses.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the description that may be found below, further serve to illustrate among other things the principles, structure, and operation of such embodiments. Variations of these embodiments will be apparent to persons of ordinary skill in the relevant art based on the teachings contained herein.

It should be understood that these figures depict embodiments of the invention. Variations of these embodiments will be apparent to persons skilled in the relevant art(s) based on the teachings contained herein.

DETAILED DESCRIPTION

The present invention may leverage the capabilities of a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same. The disclosure of U.S. Pat. No. 7,154,901, along with its associated continuations, is incorporated herein by reference.

Figure 1:
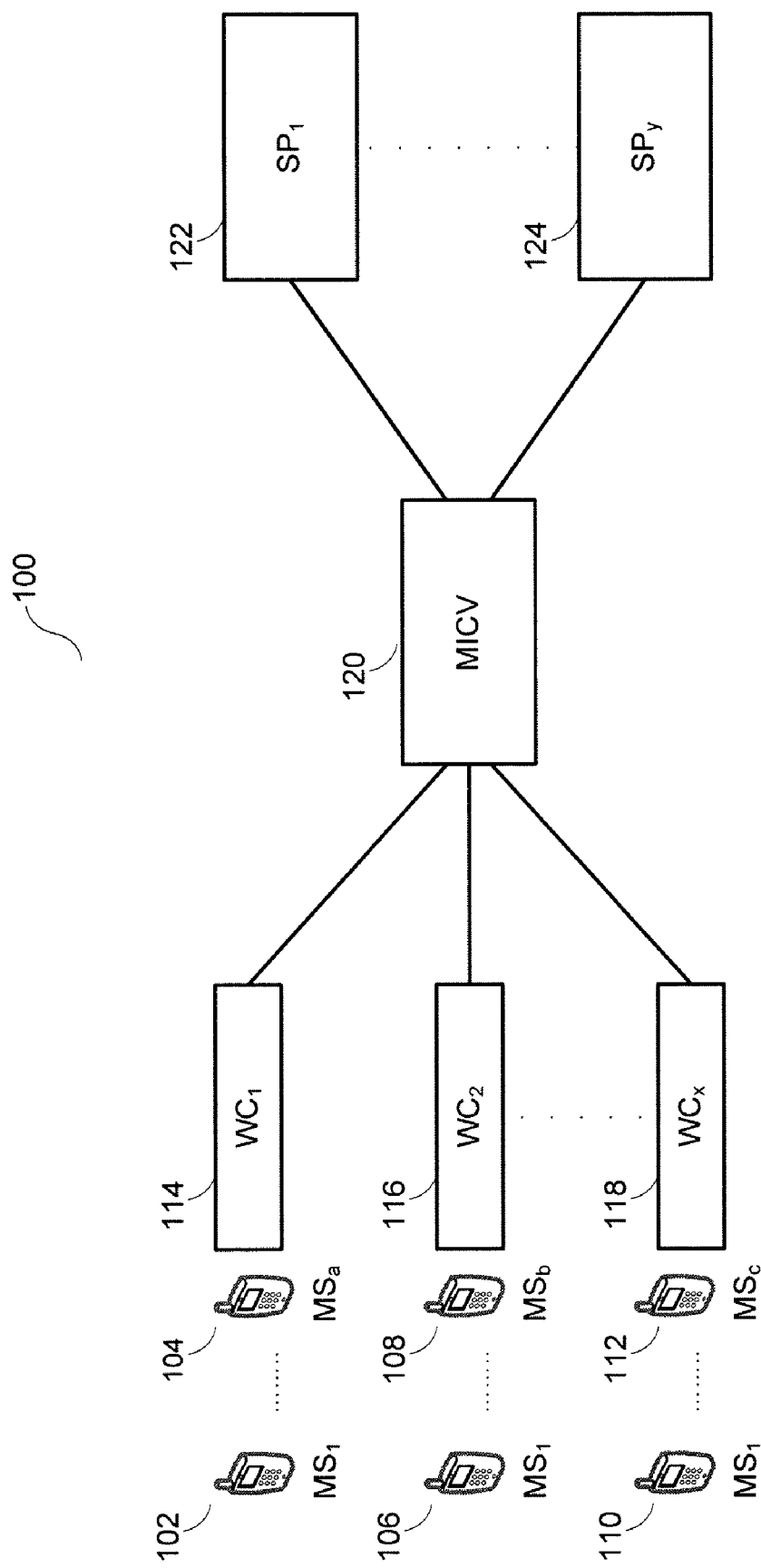
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs ($WC_1$ 114, $WC_2$ 116→$WC_x$ 118) on one side and multiple SPs ($SP_1$ 122→$SP_y$ 124) on the other side and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS⇆MS, MS⇆SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that other arrangements are equally applicable and indeed are fully within the scope of the present invention.

In the discussion below the present invention is described and illustrated as being offered by a SP. A SP may, for example, be realized through the combination of, possibly inter alia, one or more of a third-party service bureau, an element of a WC, an element of a landline carrier, an element of a MICV, multiple third-party entities working together, etc.

In the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example. Our hypothetical example includes, possibly inter alia, (1) $SP_x$ (a SP that offers a service that has been enhanced or augmented as provided through aspects of the instant invention) and (2) numerous MSs including one specific individual MS, Mary.

Figure 2:
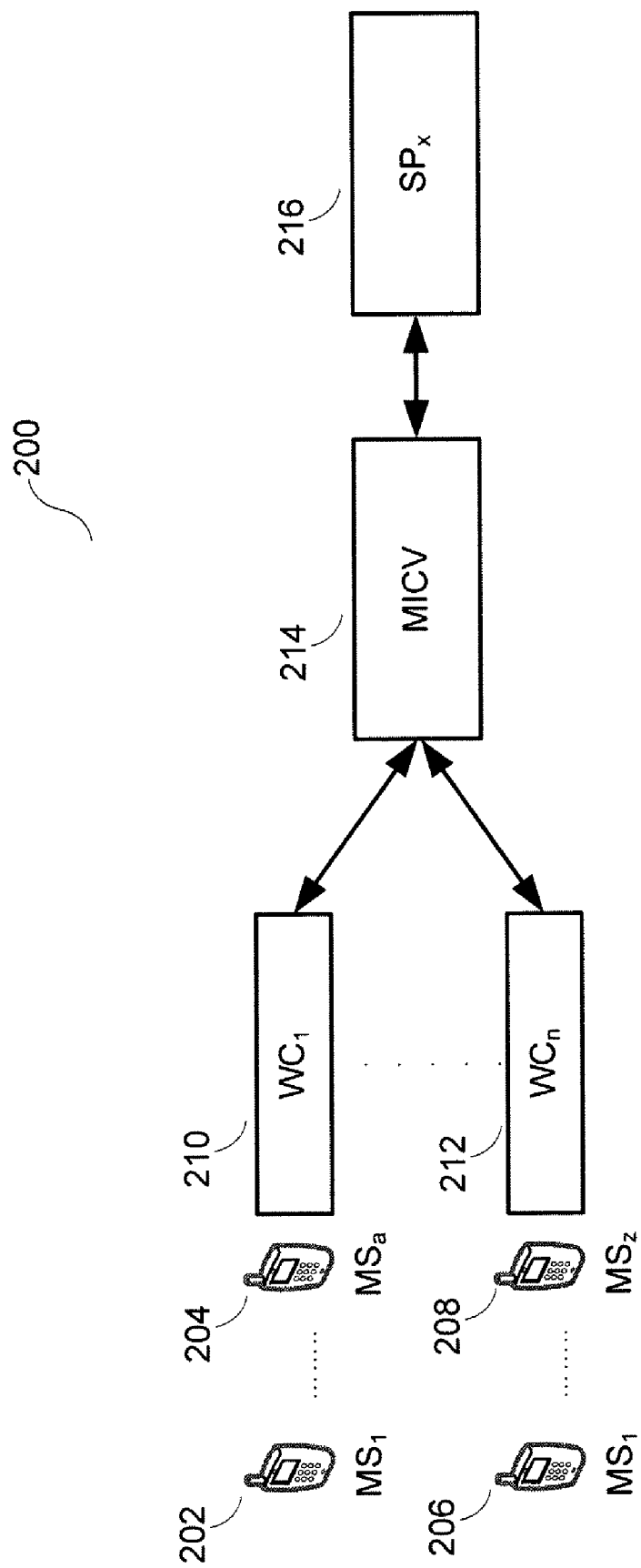
FIG. 2 illustrates one particular arrangement that is possible through aspects of the present invention.

FIG. 2 and reference numeral 200 depict one particular arrangement that may be possible under our hypothetical example. As the diagram portrays, all of the messaging traffic of numerous MSs (MS$_1$ 202→MS$_a$ 204 and MS$_1$ 206→MS$_z$ 208, including Mary) that are serviced by WCs WC$_1$ 210→WC$_n$ 212 is exchanged with a MICV 214 and the MICV 214 is connected with SP$_x$ 216 (a SP that offers, possibly inter alia, aspects of the present invention).

Figure 3:
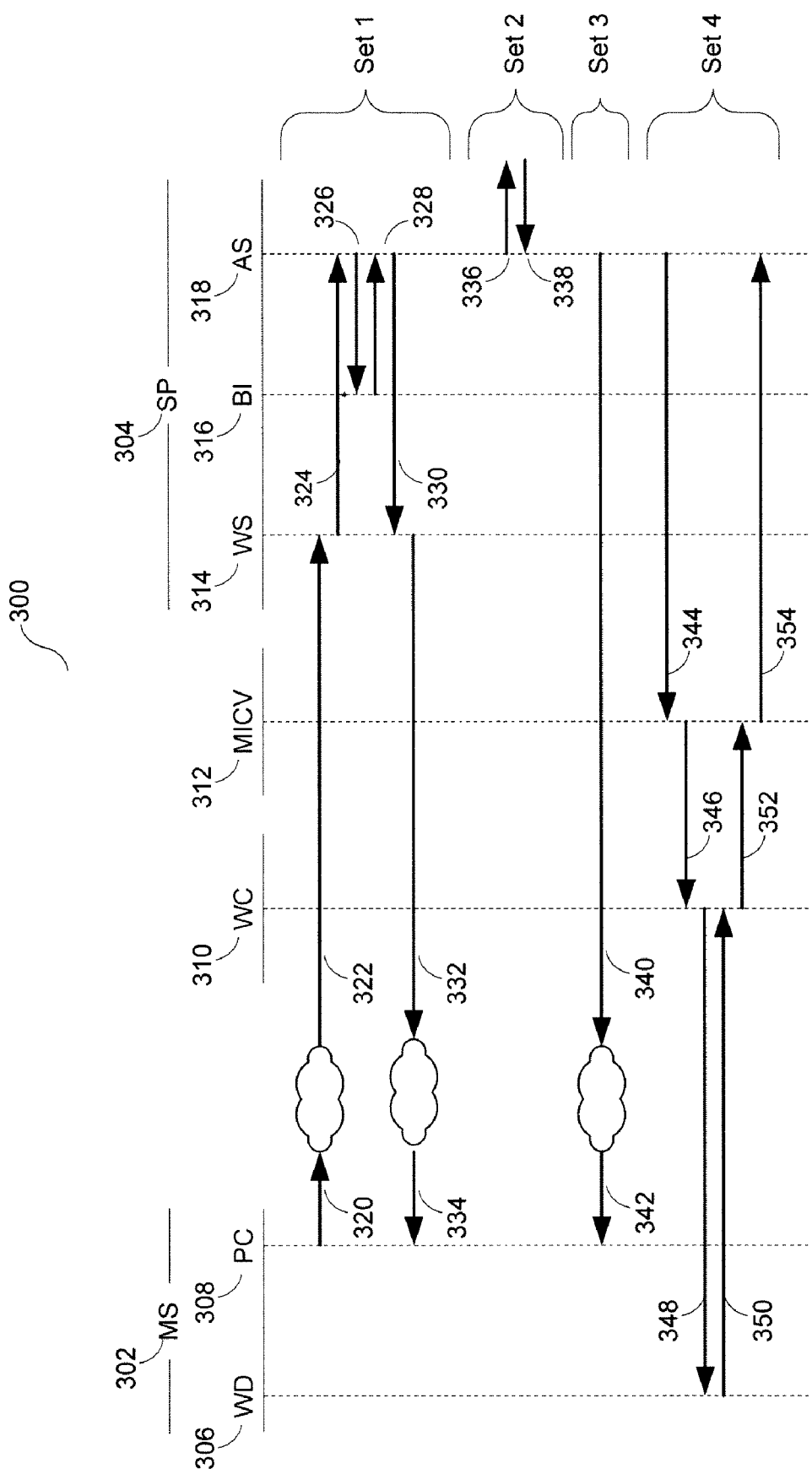
FIG. 3 illustrates various of the exchanges or interactions that are possible during an optional registration portion of the present invention.

FIG. 3 and reference numeral 300 illustrate various of the exchanges or interactions that might occur under an optional registration portion of our hypothetical example. Among other things a registration process may be tailored (e.g., the range of information gathered, the scope of services subsequently offered, etc.) to the class of user—e.g., possibly inter alia different types, categories, etc. of users (ordinary MS, WC or MICV representative, third-party representative, etc.) may complete different registration processes. Of interest and note in the diagram are the following entities:

MS 302 WD 306. For example, Mary's 302 WD such as mobile telephone, BlackBerry, PalmPilot, etc.

MS 302 Personal Computer (PC) 308. For example, one of Mary's 302 home, work, etc. PCs.

WC 310. The provider of service for Mary's 302 WD 306.

MICV 312. As noted above the use of a MICV, although not required, provides significant advantages.

SP 304 Web Server (WS) 314. A publicly-available World Wide Web (WWW) site that is optionally provided by SP$_x$ 304.

SP 304 Billing Interface (BI) 316. A single, consolidated interface that SP$_x$ 304 may use to easily reach, inter alia, one or more external entities such as a credit card or debit card clearinghouse, a carrier billing system, a service bureau that provides access to multiple carrier billing systems, etc.

SP 304 AS 318. Facilities that provide key elements of the instant invention (which will be described below).

It is important to note that while in FIG. 3 the MS 302 WD 306 and MS 302 PC 308 entities are illustrated as being adjacent or otherwise near each other, in actual practice the entities may, for example, be physically located anywhere.

In FIG. 3 the exchanges that are collected under the designation Set 1 represent the activities that might take place as Mary 302 completes a registration process with SP$_x$ 304:

A) Mary 302 uses one of her PCs 308 to visit SP$_x$'s 304 WS 314 to, possibly among other things, complete a service registration process (320→322).

B) SP$_x$'s 304 WS 314 interacts with SP$_x$'s 304 AS 318 to, possibly among other things, commit some or all of the information that Mary 302 provided to a data repository (e.g., a database), optionally complete a billing transaction, etc. (324).

C) As appropriate and as required a BI 316 completes a billing transaction (326→328).

D) Following a response (330) SP$_x$'s 304 WS 314 responds appropriately (e.g., with the presentation of a confirmation message, etc.) (332→334).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW (via, for example, a Web site that is operated by SP$_x$ 304), wireless messaging (SMS, MMS, etc.), Electronic Mail (E-Mail) messages, Instant Messaging (IM), conventional mail, telephone, Interactive Voice Response (IVR) facility, etc.

During the registration process described above a range of information may be captured from a MS including, inter alia:

A) Identifying Information. For example, possibly among other things, name, address, age, sex, a unique identifier and a password, WD TN, content preferences, etc.

B) Group Information. For example, possibly among other things, the contact information (such as for example WD TNs, E-Mail addresses, IM names/identifiers, etc.) for each of the members of one or more groups (e.g., 'Family,' 'Friends,' 'Work,' etc.) that a MS may wish to define.

C) Billing Information. Different service billing models may be offered including, inter alia, a fixed one-time charge, a recurring (monthly, etc.) fixed charge, a recurring (monthly, etc.) variable charge, a per-event charge, etc. Different payment mechanisms may be supported including, possibly among other things, credit or debit card information, authorization to place a charge on a MS's phone bill, authorization to deduct funds from a MS' (bank, brokerage, etc.) account, etc.

The specific pieces of information that were described above are illustrative only and it will be readily apparent to one of ordinary skill in the relevant art that numerous other pieces of information (e.g., additional Identifying Information, WD feature or function details, scheduled daily/weekly/ etc. reporting desired and/or on-demand reporting desired, etc.) are easily possible and indeed are fully within the scope of the present invention.

As noted above the information that Mary provided during the registration process may be preserved in a data repository (e.g., a database) and may optionally be organized as a MS profile.

The content of Mary's profile may be augmented by SP$_x$ to include, as just a few examples of the many possibilities, internal and/or external demographic, psychographic, sociological, etc. data.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, possibly inter alia:

1) The appearance of a line item charge on the bill or statement that a MS receives from her WC. Exemplary mechanics and logistics associated with this approach are described in pending U.S. patent application Ser. No. 10/837, 695 entitled "SYSTEM AND METHOD FOR BILLING AUGMENTATION." Other ways of completing or performing line item billing are easily implemented by those skilled in the art.

2) The charging of a credit card or the debiting of a debit card.

3) The (electronic, etc.) transfer of funds.

4) The generation of an invoice, statement, etc.

In FIG. 3 the exchanges that are collected under the designation Set 2 represent the activities that might take place as SP$_x$ 304 optionally coordinates, etc. with one or more external entities (such as, for example, a third-party, etc.) to, possibly among other things, secure access, confirm collected information, arrange to receive updates, etc. (see 336→338).

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as $SP_x$'s 304 AS 318 dispatches to Mary 302 one or more confirmation E-Mail messages (340→342).

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 3 the exchanges that are collected under the designation Set 4 represent the activities that might take place as $SP_x$'s 304 AS 318 dispatches one or more confirmation SMS, MMS, etc. messages to Mary's 302 WD 306 (344→348) and Mary 302 optionally replies or responds to the message(s) (350→354). Of interest and note are:

1) In the instant example the messages are shown traversing a MICV 312.

2) The SP 304 may employ a SC or a regular TN as its source address (and to which it would ask users of its service to direct any reply messages). While the abbreviated length of a SC (e.g., five digits for a SC administered by Neustar under the Common Short Code [CSC] program) incrementally enhances the experience of a MS 302 (e.g., the MS 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, possibly inter alia, the registration information that was described above may subsequently be managed (e.g., existing information may be edited or removed, new information may be added, etc.) through any combination of one or more channels including, inter alia, a SP's WWW facility, wireless messaging (SMS, MMS, etc.), E-Mail messages, IM exchanges, conventional mail, telephone, IVR facilities, etc.

To continue with our hypothetical example . . . after Mary completes a registration process (as described above) she may begin to create and send messages for which she would like to receive a reward. The criteria, conditions, etc. that may be associated with a reward may include, possibly inter alia:

1) Number of messages. For example, the more messages that Mary creates and sends (thus incrementally increasing the volume of messaging traffic that among others Mary's WC enjoys) the more reward points, credits, etc. Mary may accumulate.

2) Message audience. For example, the more messages that Mary sends to a group of recipients (as opposed to just a single recipient) the more reward points, credits, etc. Mary may accumulate.

3) Popularity indicators. For example, if Mary composes interesting, popular, etc. messages then those messages may yield incrementally more replies, responses, etc. and consequently may drive upwards possibly inter alia Mary's popularity indicator (yielding possibly inter alia more reward points, credits, etc.).

4) Message Content. For example, if Mary includes in her messages one or more pieces of content (such as possibly inter alia an advertisement, a piece of UGC, etc.) the more reward points, credits, etc. Mary may accumulate (as well as, possibly inter alia, the more hits, impressions, etc. that may be recorded for the selected pieces of content).

The factors that were described above are illustrative only and it will be readily apparent to one of ordinary skill in the relevant art that numerous other factors are easily possible and indeed are fully within the scope of the present invention.

Figure 4:
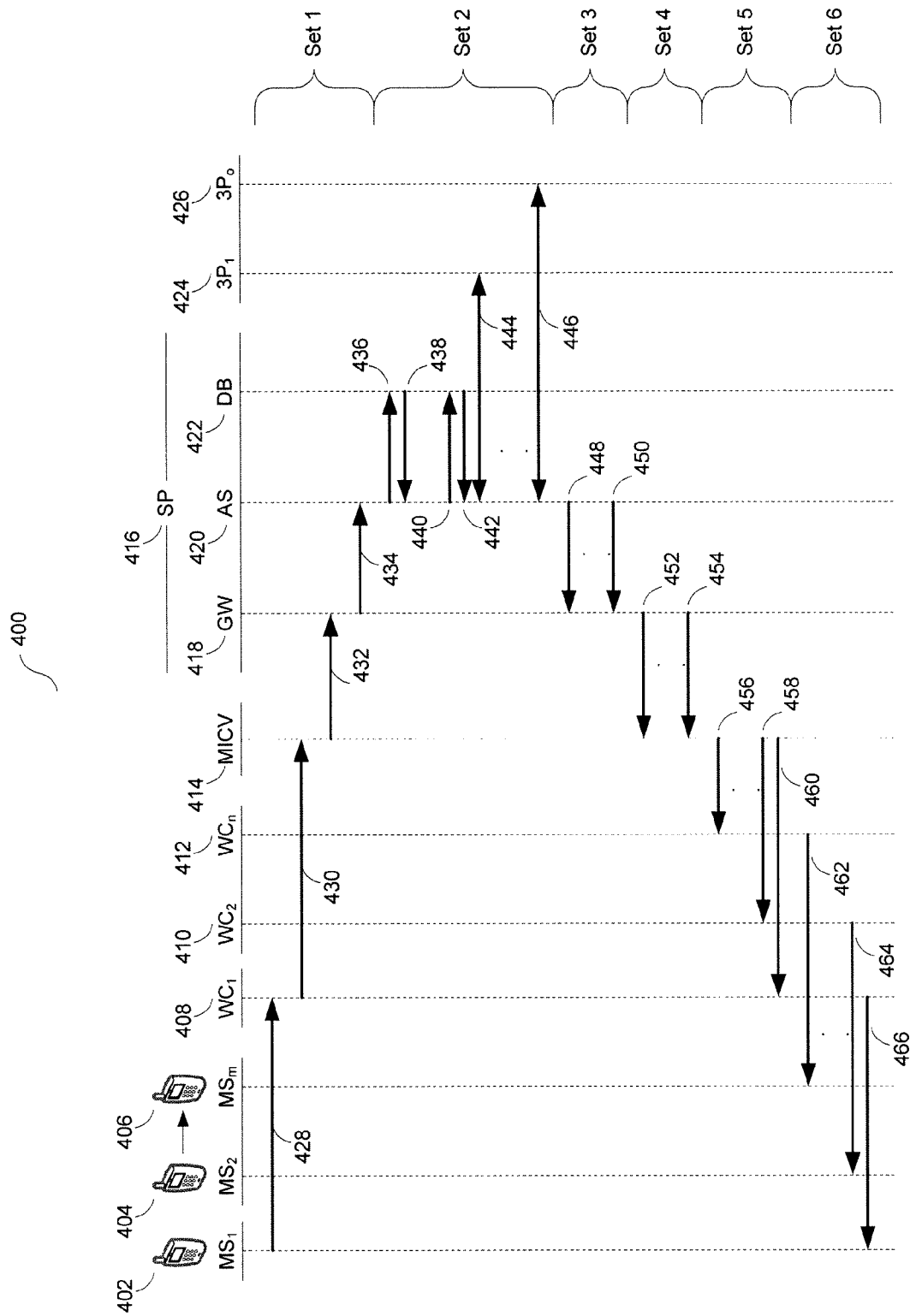
FIG. 4 illustrates various of the exchanges or interactions that are supported by aspects of the present invention.

This portion of our hypothetical example may be examined through FIG. 4 and reference numeral 400. Of interest and note in FIG. 4 are:

$MS_1$ 402. The WD of Mary, our hypothetical MS.

$MS_2$ 404→$MS_m$ 406. The WDs of various other MSs.

$WC_1$ 408. The provider of service for Mary's WD 402.

$WC_2$ 410→$WC_n$ 412. The providers of service to the other MSs $MS_2$ 404→$MS_m$.

MICV 414. As noted above the use of a MICV, although not required, provides significant advantages.

SP 416 Gateway (GW) 418. An interface through which SP 416 may possibly inter alia receive and send SMS/MMS/etc. messages.

SP 416 AS 420. Facilities that provide key elements of the instant invention (which will be described below).

SP 416 Database (DB) 422. An internal repository that a SP 416 may use to store possibly inter alia content information and MS information.

$3P_1$ 424→$3P_o$ 426. Various third-parties that may supply possibly inter alia different types of content.

Figure 5:
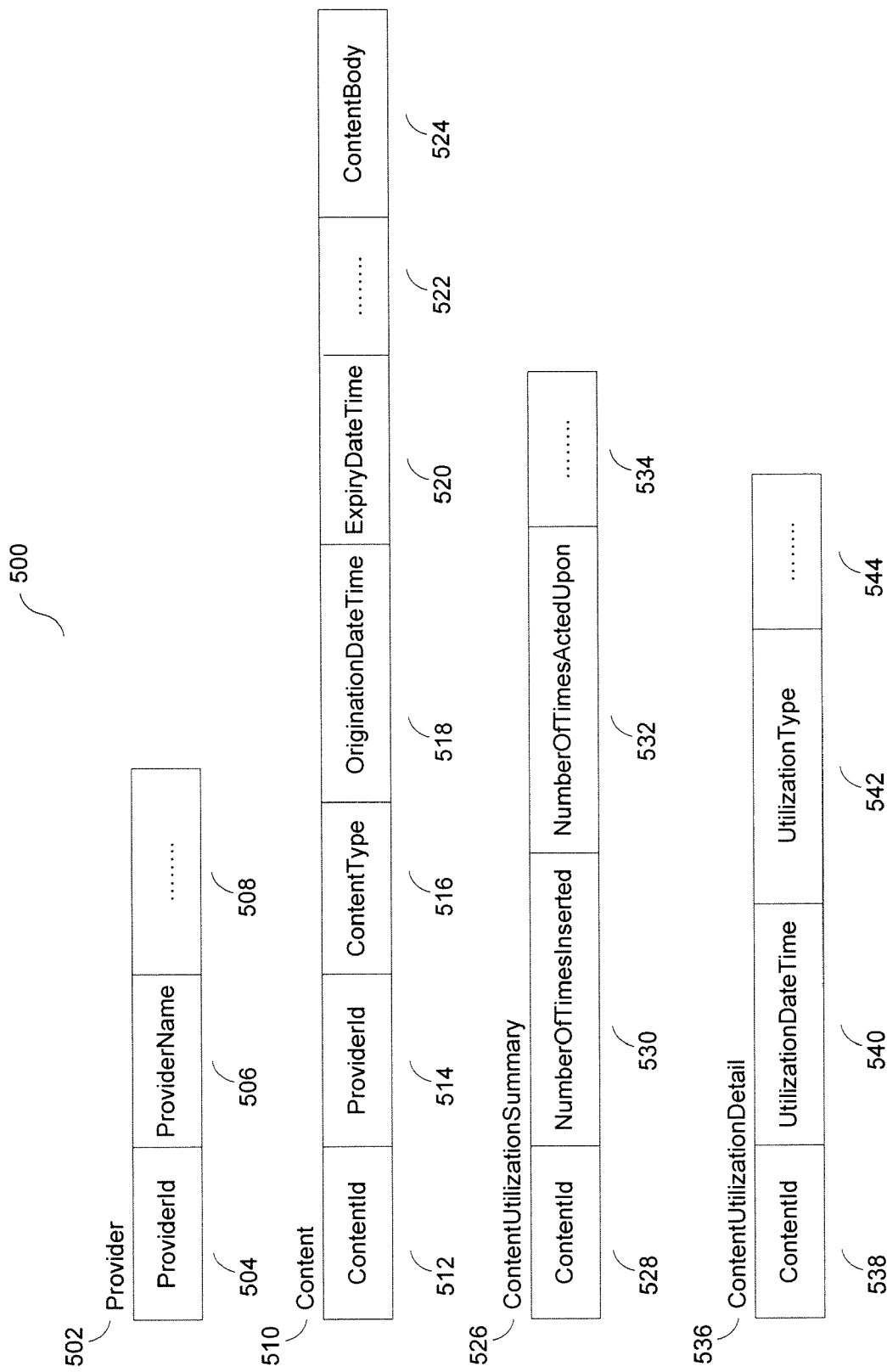
FIG. 5 depicts an illustrative organizational model for the content portion of an internal repository that might be maintained within an exemplary Service Provider (SP).

As noted above an internal repository or database 422 may contain, possibly inter alia, content information and MS information. Illustrative depictions of a portion of these two bodies of information may be found in:

1) FIG. 5 and reference numeral 500 which provide an illustrative organizational model for aspects of the content portion of such a repository. Of interest and note are:

A) Provider 502. Information (such as possibly inter alia unique internal identifier 504, name 506, etc. 508) for each provider of content.

B) Content 510. Particulars (such as possibly inter alia unique internal identifier 512/528/538, source or provider 514, type of content [such as for example text, audio, image, video, advertisement, UGC, etc.] 516, utilization from and through dates/times 518→520, the content itself 524, etc. 522) for each piece of content.

C) ContentUtilizationSummary 526. A summary of possibly inter alia the utilization of a piece of content—e.g., the number of times that a piece of content was selected by a MS for inclusion in a MS' message 530, the number of times that a piece of content was acted upon (in some way) by a recipient of a MS' message 532, etc. 534.

D) ContentUtilizationDetail 536. The details behind ContentUtilizationSummary 526 including possibly inter alia a date/time stamp 540, a utilization indicator 542, etc. 544.

Figure 6:
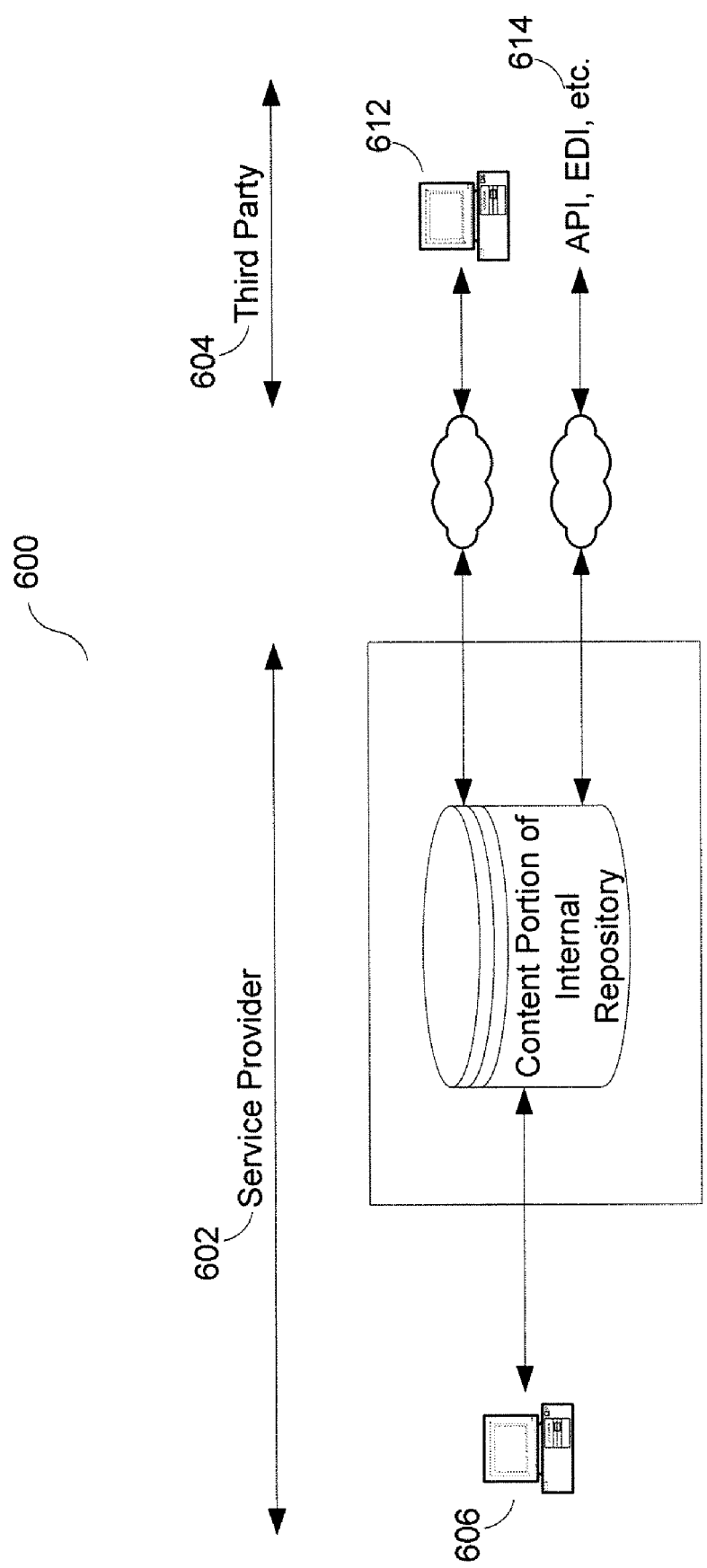
FIG. 6 illustrates one particular content management arrangement that is possible through aspects of the present invention.

FIG. 6 and reference numeral 600 illustrate one possible arrangement through which the content portion of an internal repository may, possibly inter alia, be managed. For example, a Third Party 604 (such as $3P_1$ 424→$3P_o$ 426 in FIG. 4) may perform any combination of management activities (e.g., the addition of new content, the updating of existing content, the removal or deletion of existing content, etc.) through any combination of one or more of channels including possibly inter alia a WWW-based interface 612, a programmatic interface 614, etc. As well, SP representatives 602 may perform possibly inter alia administrative tasks, reporting activities, management activities, etc. through possibly inter alia a WWW-based interface 606.

Figure 7:
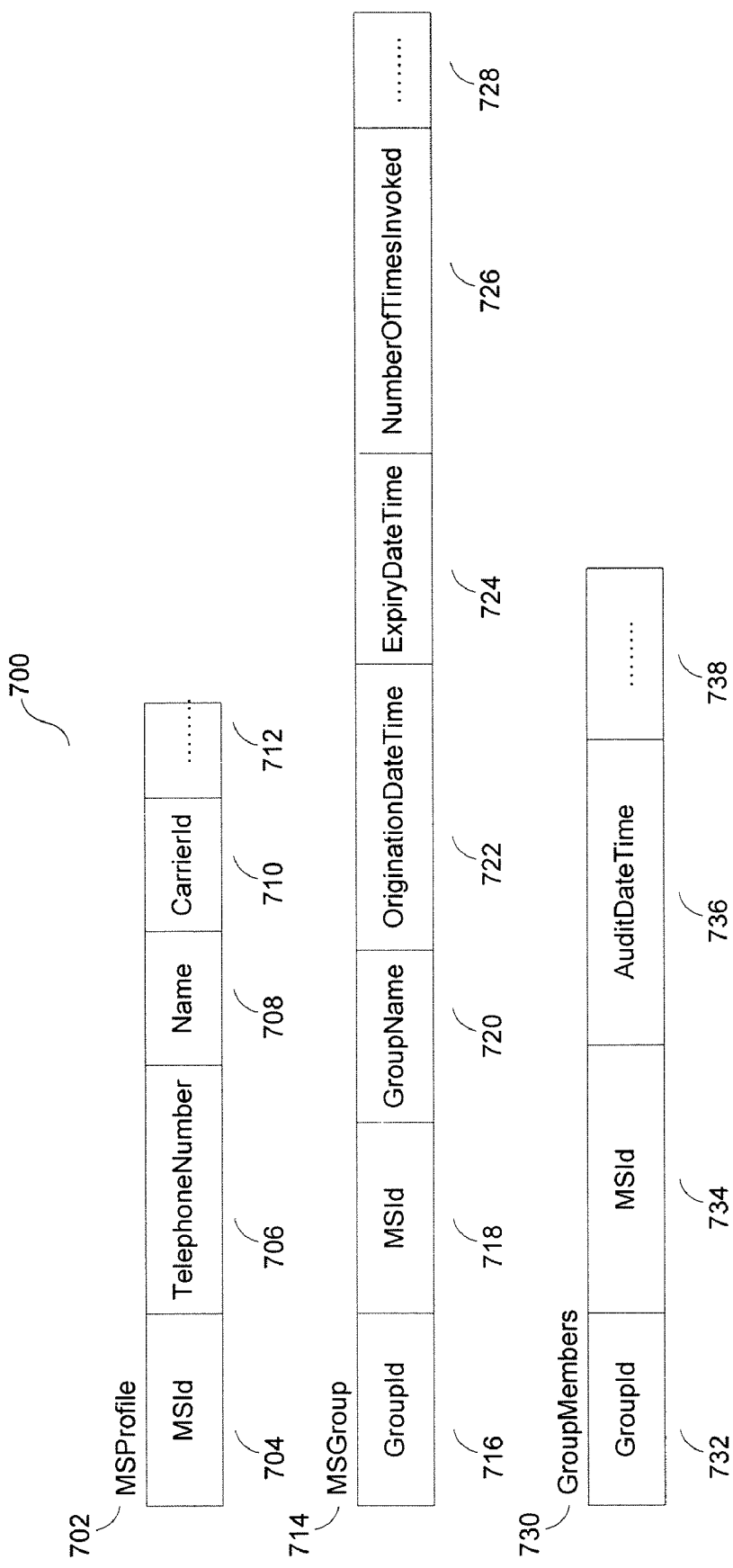
FIG. 7 depicts an illustrative organizational model for the MS portion of an internal repository that might be maintained within an exemplary SP.

2) FIG. 7 and reference numeral 700 which provide an illustrative organizational model for aspects of the MS portion of such a repository. This portion might contain possibly inter alia aspects or elements of the MS profile that was described previously during the discussion of the optional registration process. Of interest and note are:

A) MSProfile 702. Information (such as possibly inter alia unique internal identifier 704, TN 706, name 708, servicing WC 710, etc. 712) for each MS.

B) MSGroup 714. Information (such as possibly inter alia unique identifier 716/732, originating or creating MS 718, name 720, etc. 722→728) for each group that is defined by a MS.

C) GroupMembers 730. For each group details such as possibly inter alia the members 734 of the group, etc. 736→738.

Using the illustrative organizational model that was described above one might have (as one simple example):

| MSId | TelephoneNumber | Name | CarrierId | ... |
|------|-----------------|------|-----------|-----|
| 1001 | 7035551212 | Mary | 2003 | |
| 1002 | 7035559876 | Sally | 2006 | |
| 1003 | 7035554321 | Joe | 2023 | |
| 1004 | 7035556543 | Kathy | 2003 | |
| 1005 | 7035558765 | Sarah | 2007 | |
| . | | | | |
| . | | | | |
| . | | | | |

| GroupId | MSId | GroupName | ... |
|---------|------|-----------|-----|
| 3001 | 1001 | Close Friends | |
| 3002 | 1001 | Family | |
| 3003 | 1001 | Work | |
| . | | | |
| . | | | |
| . | | | |

| GroupId | MSId | ... |
|---------|------|-----|
| 3001 | 1002 | |
| 3001 | 1005 | |
| 3001 | 1003 | |
| 3001 | 1004 | |

In other words, Mary (MS 1001 who has a WD with a TN of 7035551212) has possibly inter alia defined three different groups ('Close Friends' and 'Family' and 'Work') with the group 'Close Friends' containing four (4) members—Sally (MS 1002 who has a WD with a TN of 7035559876), Sarah (MS 1005 who has a WD with a TN of 7035558765), Joe (MS 1003 who has a WD with a TN of 7035554321), and Kathy (MS 1004 who has a WD with a TN of 7035556543).

Returning to FIG. 4 . . . the exchanges that are collected under the designation Set 1 represent the activities that might take place as:

1) Mary 402 creates a (SMS/MMS/IMS/etc.) message and dispatches the message (428). The message might contain, possibly inter alia, a body or payload, a recipient indicator (such as for example an individual, a group, etc.), a content indicator, etc.

2) The message is passed by Mary's 402 WC 408 to a MICV 414 (430).

3) The MICV 414 passes the message to a GW 418 of $SP_x$ 416 (432).

4) The GW 418 passes the message to an AS 420 of $SP_x$ 416 (434).

The specific exchanges that were described above (as residing under the designation Set 1) are illustrative only and it will be readily apparent to one of ordinary skill in the relevant art that numerous other exchanges are easily possible and indeed are fully within the scope of the present invention.

The exchanges that are collected under the designation Set 2 represent the activities that might take place as the AS 420 completes a series of processing steps, including possibly inter alia:

1) Extract various data elements (such as possibly inter alia the source TN of the message to identify the originating MS) from the received message.

2) Leveraging a body of flexible, extensible, and dynamically configurable rules, procedures, etc. optionally perform one or more edit, validation, etc. operations on the extracted data elements.

3) Retrieve the originating MS' profile from the MS portion of an internal repository (436→438).

4) Based on for example a combination of one or more of elements of the retrieved MS profile, portions of the content of the MS' message, random selections, rankings or ratings, rules, logic, etc. determine the specific piece(s) of content (such as possibly inter alia an advertisement, a piece of UGC, etc.), if any, that is/are required.

5) As required retrieve the identified content (from any combination of one or more of the content portion of an internal repository, one or more external 3Ps, etc.) (440→442 and 444→446).

6) Increment one or more internal counters including possibly inter alia a 'number of messages sent' counter for Mary, a 'number of times inserted' counter for each of the pieces of content, etc.

The catalog of processing steps that was described above is illustrative only and it will be readily apparent to one of ordinary skill in the relevant art that numerous other processing steps are easily possible and indeed are fully within the scope of the present invention.

The specific exchanges that were described above (as residing under the designation Set 2) are illustrative only and it will be readily apparent to one of ordinary skill in the relevant art that numerous other exchanges are easily possible and indeed are fully within the scope of the present invention.

The exchanges that are collected under the designation Set 3 represent the activities that might take place as the AS 420 possibly inter alia generates outgoing (SMS/MMS/etc.) message(s) (448→450). For example, if Mary is sending a message to a group then (e.g., from possibly inter alia a recipient code or indicator in Mary's message, one or more entries from Mary's MS profile, etc.) determine possibly inter alia the address (e.g., the TN) of each of the recipients (i.e., the address [e.g., the TN] of each of the members of the group). Each outgoing message may include possibly inter alia some or all of the content of Mary's original message (as originally received or possibly in modified form); other textual, graphic, etc. material (as appropriate and as required); the previously-secured content; etc.

The specific exchanges that were described above (as residing under the designation Set 3) are illustrative only and it will be readily apparent to one of ordinary skill in the relevant art that numerous other exchanges are easily possible and indeed are fully within the scope of the present invention.

The exchanges that are collected under the designation Set 4 represent the activities that might take place as the GW 418 possibly inter alia dispatches all of the outgoing message(s) (452→454). In the instant example the outgoing messages are directed to a MICV 414.

The specific exchanges that were described above (as residing under the designation Set 4) are illustrative only and it will be readily apparent to one of ordinary skill in the relevant art that numerous other exchanges are easily possible and indeed are fully within the scope of the present invention.

The exchanges that are collected under the designation Set 5 represent the activities that might take place as the MICV 414 delivers the messages to one or more WCs (WC$_1$ 408 and WC$_2$ 410→WC$_n$ 412, see 456→460).

The specific exchanges that were described above (as residing under the designation Set 5) are illustrative only and it will be readily apparent to one of ordinary skill in the relevant art that numerous other exchanges are easily possible and indeed are fully within the scope of the present invention.

The exchanges that are collected under the designation Set 6 represent the activities that might take place as the WCs (WC$_1$ 408 and WC$_2$ 410→WC$_n$ 412) deliver the messages to the recipient MSs (MS$_1$ 402 and MS$_2$ 404→MS$_m$ 406, see 462→466).

The specific exchanges that were described above (as residing under the designation Set 6) are illustrative only and it will be readily apparent to one of ordinary skill in the relevant art that numerous other exchanges are easily possible and indeed are fully within the scope of the present invention.

The Set 1→Set 6 exchanges that were described above are illustrative only and it will be readily apparent to one of ordinary skill in the relevant art that numerous other exchanges are easily possible and indeed are fully within the scope of the present invention. For example, possibly inter alia:

1) If a recipient of a message from Mary replies or responds to the message then possibly inter alia the processing steps that were described above would be invoked and one or more internal counters may be incremented (including possibly inter alia a 'number of sent messages replied to' counter for Mary, etc.).

2) If a recipient of a message from Mary acts upon the content that is contained in the message (e.g., they visit a URL, they reply to a particular TN or SC, etc.) then possibly inter alia one or more internal counters may be incremented (including possibly inter alia a 'number of times acted upon' counter for any pieces of content, etc.).

3) Mary may optionally be incented to select a particular piece of content (e.g., an advertisement, a piece of UGC, etc.), through possibly inter alia enhanced reward offerings (e.g., a particular piece of content may carry, possibly for some limited period of time, a higher-than normal number of reward points, credits, etc.), from possibly inter alia a pool or catalog of content. For example, Mary's selection of a particular advertisement may be viewed possibly inter alia as an endorsement of the product or service that is reflected in the advertisement (said endorsement possibly heightened or amplified by Mary's popularity among the recipients of her messages), as an indication by Mary of the appropriateness to the recipients of her message of the product or service that is reflected in the advertisement, etc.

4) Based on possibly inter alia a combination of one or more of elements of Mary's profile, the content of Mary's message, prioritized (advertisement, etc.) rankings, etc. a SP may select for Mary a particular advertisement for inclusion in Mary's message.

5) Rewards may be realized (e.g., accumulated, monitored, etc.) through any combination of any number of artifacts including, possibly inter alia, internal points or credits, cash, etc.

6) A MS may be allowed to monitor the status of their reward points, credits, cash, etc. through any combination of any number of channels including, possibly inter alia, a WWW site, (SMS/MMS/etc.) messaging, IVR, E-mail, postal mail, etc.

7) A MS may be allowed to redeem their accumulated reward points, credits, cash, etc. as any combination of any number of means (including, possibly inter alia, cash, free service offerings, product coupons and/or discounts, etc.) through any combination of any number of channels (including, possibly inter alia, a MS' WC [e.g., by communicating, interacting, etc. with the MS' WC to, possibly inter alia, facilitate the MS receiving their accumulated points/credits/cash/etc. on the MS' monthly statement], a WWW site, E-mail, postal mail, etc.).

The confirmation, report, etc. message(s) that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service [LBS], Global Positioning System [GPS], etc. facility).

The confirmation, report, etc. message(s) that were identified above may optionally contain advertising—e.g., textual material if an SMS model is being utilized, multimedia (images of brand logos, sound, video snippets, etc.) material if an MMS model is being utilized, etc. The advertising material may be selected statically (e.g., all generated messages are injected with the same advertising material that is, for example, selected from a pool of available material), selected randomly (e.g., a generated message is injected with advertising material that is, for example, randomly selected from a pool of available material), or selected based on location (i.e., a generated message is injected with advertising material that is, for example, selected from a pool of available material based on the current physical location of the recipient of the message as derived from, as one example, a LBS, GPS, etc. facility). Third parties (such as, for example, advertising agencies, brands, etc.) may contribute advertising material to a SP's pool of advertising material.

The confirmation, report, etc. message(s) that were identified above may optionally contain promotional materials (e.g., still images, video clips, etc.).

Figure 8:
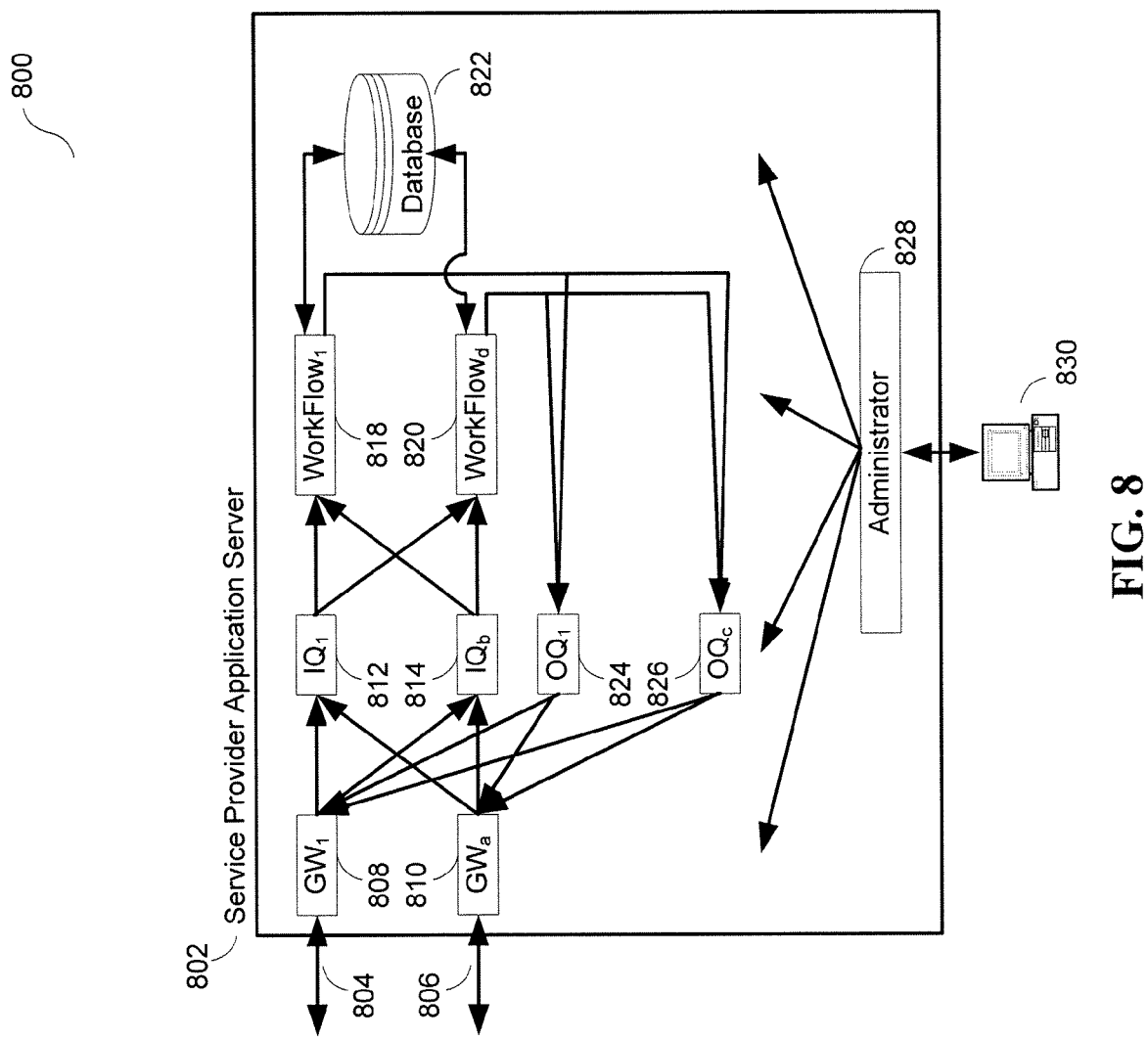
FIG. 8 is a diagrammatic presentation of aspects of an exemplary SP Application Server (AS).

FIG. 8 and reference numeral 800 provides a diagrammatic presentation of aspects of an exemplary SP AS 802. The illustrated AS 802 contains several key components—Gateways (GW$_1$ 808→GW$_a$ 810 in the diagram), Incoming Queues (IQ$_1$ 812→IQ$_b$ 814 in the diagram), WorkFlows (WorkFlow$_1$ 818→WorkFlow$_d$ 820 in the diagram), Database 822, Outgoing Queues (OQ$_1$ 824→OQ$_c$ 826 in the diagram), and an Administrator 828. It will be readily apparent to one of ordinary skill in the relevant art that numerous other components are possible within an AS 802.

A dynamically updateable set of one or more Gateways (GW$_1$ 808→GW$_a$ 810 in the diagram) handle incoming (SMS/MMS/etc. messaging, etc.) traffic (804→806) and outgoing (SMS/MMS/etc. messaging, etc.) traffic (804→806).

Incoming traffic (804→806) is accepted and deposited on an intermediate or temporary Incoming Queue (IQ$_1$ 812→IQ$_b$ 814 in the diagram) for subsequent processing. Processed artifacts are removed from an intermediate or temporary Outgoing Queue (OQ$_1$ 824→OQ$_c$ 826 in the diagram) and then dispatched (804→806).

A dynamically updateable set of one or more Incoming Queues (IQ$_1$ 812→IQ$_b$ 814 in the diagram) and a dynamically updateable set of one or more Outgoing Queues (OQ$_1$ 824→OQ$_c$ 826 in the diagram) operate as intermediate or temporary buffers for incoming and outgoing traffic (804→806).

A dynamically updateable set of one or more WorkFlows (WorkFlow$_1$ 818→WorkFlow$_d$ 820 in the diagram) remove incoming traffic from an intermediate or temporary Incoming Queue (IQ$_1$ 812→IQ$_b$ 814 in the diagram), perform all of the required processing operations, and deposit processed artifacts on an intermediate or temporary Outgoing Queue (OQ$_1$ 824→OQ$_c$ 826 in the diagram). The WorkFlow component will be described more fully below.

The Database 822 that is depicted in FIG. 8 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 828 that is depicted in FIG. 8 provides management or administrative control over all of the different components of an AS 802 through, as one example, a WWW-based interface 830. It will be readily apparent to one of ordinary skill in the relevant art that numerous other interfaces (e.g., a data feed, an Application Programming Interface [API], etc.) are easily possible.

Through flexible, extensible, and dynamically updatable configuration information a WorkFlow component may be quickly and easily realized to support any number of activities. For example, WorkFlows might be configured to support a registration process; to support interactions with external entities such as third-parties; to support various of the internal processing steps that were described above; to support the generation and dispatch of outgoing, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, analytical, messaging, etc. activities (e.g., aspects of received monitoring information, generated events, dispatched notification messages, etc.) may be recorded. Among other things, such a repository may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

Figure 9:
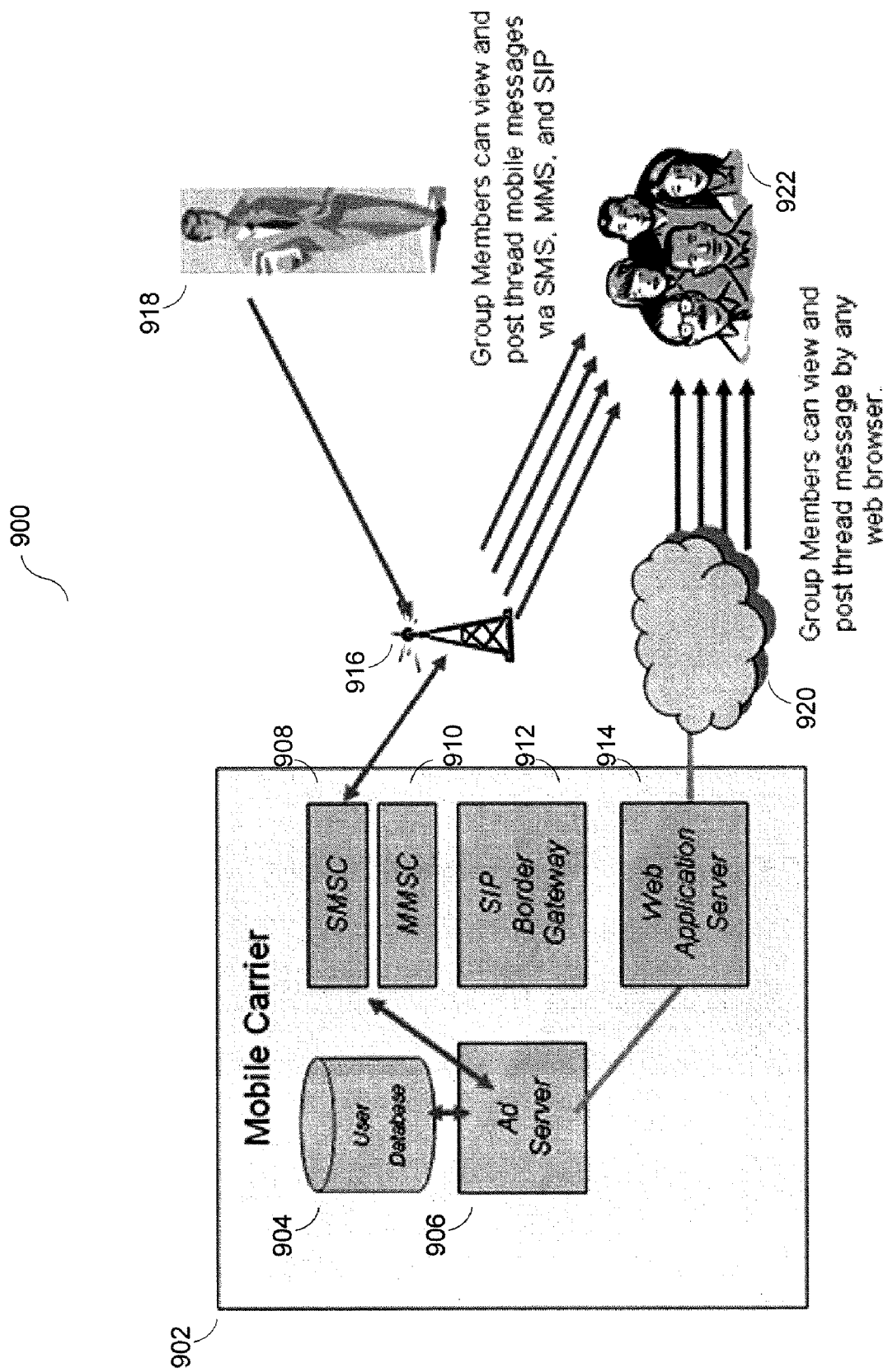
FIG. 9 depicts an illustrative arrangement that is possible through aspects of the present invention.

With the benefit of the foregoing discussion the illustrative arrangement that is presented through FIG. 9 and reference numeral 900 will now be clear. That is, among other things an individual MS 918 may create and send a SMS message via wireless infrastructure 916 (that may contain, possibly inter alia, a body or payload, a recipient indicator that identifies a specific group, and a content indicator). The message may be received by a Short Message Service Center (SMSC) 908 within a WC 902. Alternatively, an MMS message may be received by Multimedia Message Service Center (MMSC) 910 or a Session Initiation Protocol (SIP) message may be received by SIP Border Gateway 912. The message may be processed (in the instant diagram by the component designated 'Ad Server' 906 which may implement possibly inter alia aspects of an SP AS as described above and which may leverage possibly inter alia a repository (user database) 904 that may contain among other things content information and MS information) and some number of outgoing messages (containing possibly inter alia the body of the original message [from MS 918] along with the desired content) may be generated and then dispatched to the members of the target group 922. To the extent the desired content successfully drives members of the target group 922 to access a given website, web application server 914 may thereafter be accessed, and still additional content can be provided to members of the target group 922 via network 920.

It is important to note that while aspects of the discussion that was presented above referenced the inclusion in messages of specific types of content (such as advertisements and UGC) it will be readily apparent to one of ordinary skill in the relevant art that (a) such inclusion is entirely optional (that is, the reward mechanism that was described above is capable of functioning without such content) and (b) the inclusion of numerous other types of content is easily possible.

It is important to note that while aspects of the discussion that was presented above referenced the use of TNs and SCs it will be readily apparent to one of ordinary skill in the relevant art that other message address identifiers are equally applicable and, indeed, are fully within the scope of the present invention.

The discussion that was just presented referenced the specific wireless messaging paradigms—SMS and MMS. These paradigms potentially offer an incremental advantage over other paradigms in that native support for SMS and/or MMS is commonly found on a WD that a potential MS would be carrying. However, it is to be understood that it would be readily apparent to one of ordinary skill in the relevant art that other paradigms (such as, for example, IMS, IM, E-Mail, WAP, etc.) are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
|---------|---------|
| API | Application Programming Interface |
| AS | Application Server |
| BI | Billing Interface |
| CSC | Common Short Code |
| DB | Database |
| DBMS | Database Management System |
| E-Mail | Electronic Mail |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IVR | Interactive Voice Response |
| LBS | Location-Based Service |
| MICV | Messaging Inter-Carrier Vendor |
| MMS | Multimedia Message Service |
| MMSC | Multimedia Message Service Center |
| MS | Mobile Subscriber |
| ODBMS | Object Database Management System |
| OQ | Outgoing Queue |
| PC | Personal Computer |
| RDBMS | Relational Database Management System |
| SC | Short Code |
| SIP | Session Initiation Protocol |
| SMS | Short Message Service |
| SMSC | Short Message Service Center |
| SP | Service Provider |
| 3P | Third Party |
| TN | Telephone Number |
| UGC | User Generated Content |
| URL | Uniform Resource Locator |
| WAP | Wireless Application Protocol |
| WC | Wireless Carrier |
| WD | Wireless Device |
| WF | WorkFlow |
| WS | Web Server |
| WWW | World-Wide Web |

What is claimed is:

1. A method for rewarding mobile subscribers, comprising:
receiving at a gateway an incoming message, the incoming message having been originally initiated as a wireless message by a mobile subscriber;
performing the steps of:
(a) leveraging information previously supplied by the mobile subscriber,
(b) acting upon at least aspects of the incoming message,
(c) identifying one or more destination addresses based on (a) the information previously supplied by the mobile subscriber and (b) an indicator in the incoming message,
(d) optionally retrieving content, yielding retrieved content, and
(e) incrementing the value of at least one reward counter; and
generating one or more outgoing messages, the outgoing messages (a) including at least aspects of the incoming message and if applicable the retrieved content and (b) addressed to the one or more destination addresses,
wherein the one or more destination addresses respectively correspond to addresses of wireless devices that are different from an address belonging to a wireless device of the mobile subscriber from which the incoming message was originally initiated.

2. The method of claim 1, wherein the incoming message and the outgoing messages are each one of a Short Message Service message, a Multimedia Message Service message, an IP Multimedia Subsystem message, or an Instant Messaging message.

3. The method of claim 1, wherein the processing steps include a billing transaction.

4. The method of claim 1, wherein the information previously supplied by the mobile subscriber is defined by the mobile subscriber during a registration process.

5. The method of claim 4, wherein the registration process comprises at least one of Identifying Information, Group Information, and Billing Information.

6. The method of claim 4, wherein the registration process includes a billing component.

7. The method of claim 1, wherein the retrieved content comprises one or more of (a) an advertisement, (b) User Generated Content, and (c) a Uniform Resource Locator.

8. The method of claim 1, wherein the unit of measure of the at least one reward counter is one of (a) money, (b) points, or (c) credits.

9. The method of claim 1, wherein the mobile subscriber is able to monitor the value of the at least one reward counter.

10. The method of claim 1, further comprising the mobile subscriber redeeming some portion of the at least one reward counter as a reward.

11. The method of claim 10, wherein the magnitude of the reward is based on at least one or more of (a) number of messages and (b) message audience.

12. The method of claim 10, wherein the magnitude of the reward is based on a popularity indicator.

13. The method of claim 10, wherein the magnitude of the reward is based on content inclusion.

14. The method of claim 10, wherein the reward is one or more of (a) cash, (b) cash equivalent, (c) service offering, (d) coupon, or (e) discount.

15. The method of claim 1, further comprising incrementing the value of at least one reward counter in response to a recipient of the one or more outgoing messages acting upon aspects of the retrieved content.

16. A system for rewarding mobile subscribers, comprising:
a gateway at which an incoming message is received, the incoming message having been originally initiated as a wireless message by a mobile subscriber;
workflow modules, the workflow modules being operable to:
(a) leverage information previously supplied by the mobile subscriber,
(b) act upon at least aspects of the incoming message,
(c) identify one or more destination addresses based on (a) the information previously supplied by the mobile subscriber and (b) an indicator in the incoming message,
(c) optionally retrieve content, yielding retrieved content,
(d) increment the value of at least one reward counter, and
(e) generate one or more outgoing messages, the outgoing messages (i) including at least aspects of the incoming message and if applicable the retrieved content and (ii) addressed to the one or more destination addresses,
wherein the one or more destination addresses respectively correspond to addresses of wireless devices that are different from an address belonging to a wireless device of the mobile subscriber from which the incoming message was originally initiated.

17. The system of claim 16, wherein the incoming message and the outgoing messages are each one of a Short Message Service message, a Multimedia Message Service message, an IP Multimedia Subsystem message, or an Instant Messaging message.

18. The system of claim 16, wherein the workflow modules complete a billing transaction.

19. The system of claim 16, wherein the information previously supplied by the mobile subscriber is defined by the mobile subscriber during a registration process.

20. The system of claim 19, wherein the registration process comprises at least one of Identifying Information, Group Information, and Billing Information.

21. The system of claim 19, wherein the registration process includes a billing component.

22. The system of claim 16, wherein the retrieved content comprises one or more of (a) an advertisement, (b) User Generated Content, and (c) a Uniform Resource Locator.

23. The system of claim 16, wherein the unit of measure of the at least one reward counter is one of (a) money, (b) points, or (c) credits.

24. The system of claim 16, wherein the mobile subscriber is able to monitor the value of the at least one reward counter.

25. The system of claim 16, further comprising the mobile subscriber redeeming some portion of the at least one reward counter as a reward.

26. The system of claim 25, wherein the magnitude of the reward is based on at least one or more of (a) number of messages and (b) message audience.

27. The system of claim 25, wherein the magnitude of the reward is based a popularity indicator.

28. The system of claim 25, wherein the magnitude of the reward is based on content inclusion.

29. The system of claim 25, wherein the reward is one or more of (a) cash, (b) cash equivalent, (c) service offering, (d) coupon, or (e) discount.

30. The system of claim 16, further comprising incrementing the value of at least one reward counter in response to a recipient of the one or more outgoing messages acting upon aspects of the retrieved content.

* * * * *